May 25, 1926.

C. QUADE 1,585,876

GRAIN ELEVATOR AND BLOWER

Filed July 9, 1924    3 Sheets-Sheet 1

Inventor
Charles Quade.
Lacey & Lacey, Attorneys

May 25, 1926.
C. QUADE
1,585,876
GRAIN ELEVATOR AND BLOWER
Filed July 9, 1924
3 Sheets-Sheet 2
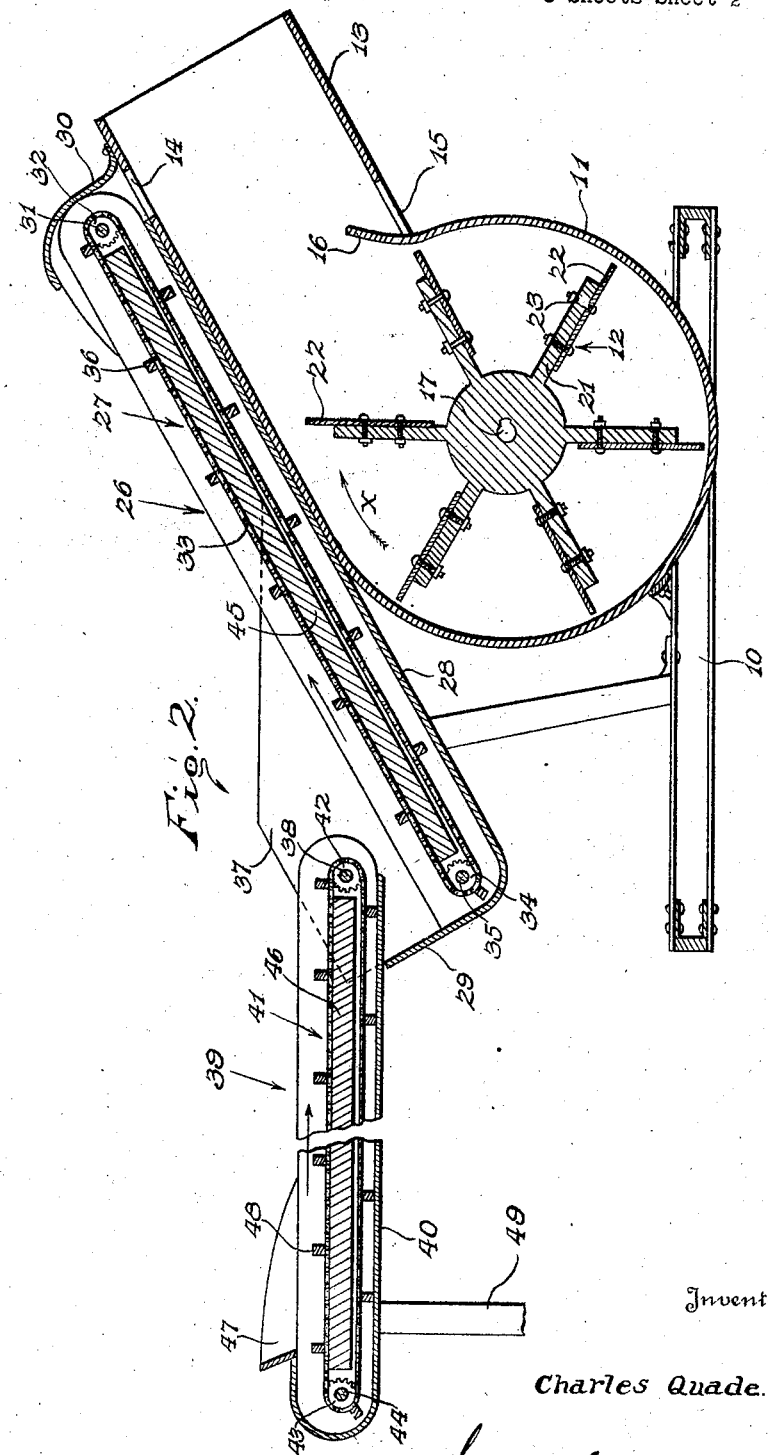
Inventor
Charles Quade.
Lacey & Lacey, Attorney.

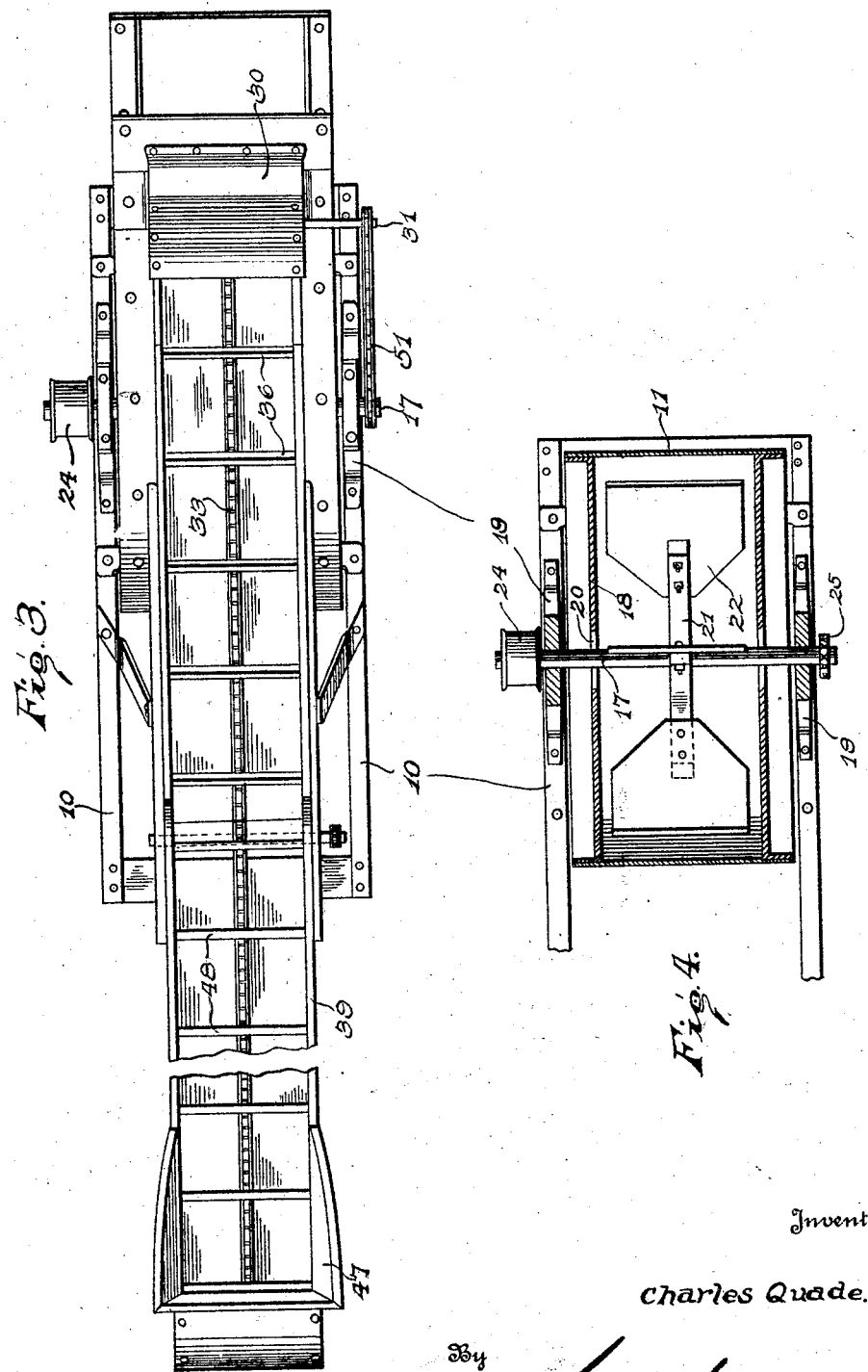

Patented May 25, 1926.

1,585,876

UNITED STATES PATENT OFFICE.

CHARLES QUADE, OF JANESVILLE, MINNESOTA.

GRAIN ELEVATOR AND BLOWER.

Application filed July 9, 1924. Serial No. 725,033.

The present invention relates to an apparatus for unloading grain from a wagon and elevating it to a granary and incidentally for cleaning grain from dust, chaff and other foreign matter mixed with the grain. It is mainly intended for cleaning small grain, such as wheat, oats, barley, rye and shelled corn.

The apparatus consists of a belt or chain conveyer for lifting the grain to a certain level from where it is dropped past a strong air current produced by a fan. In this manner all dust and foreign matter will be removed and the cleaned grain collected at the front end of the apparatus.

In the accompanying drawings, one embodiment of the invention is illustrated, and Figure 1 is a side elevation of the grain unloading and cleaning apparatus;

Fig. 2 is a vertical longitudinal section thereof;

Fig. 3 is a top plan view, and

Fig. 4 is a section on the line 4—4 of Figure 1.

Figure 1:
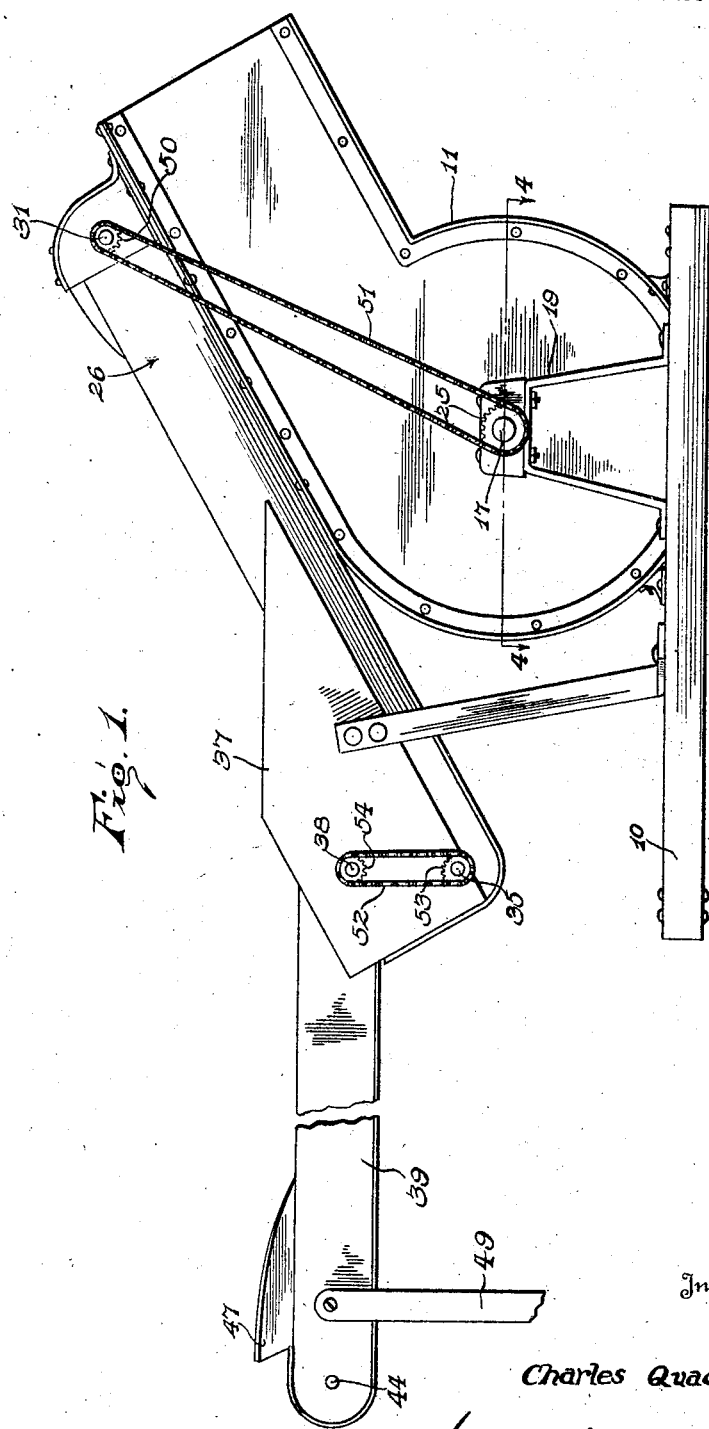

In the drawings, the reference numeral 10 represents a base for the apparatus and the reference numeral 11 represents a casing for a fan 12 enclosed therein. The casing is of cylindrical shape and is provided with an upwardly directed spout 13 which has a grain-receiving opening 14 on its upper side adjacent the mouth of the spout. Almost directly under this opening is furnished a discharge opening 15 where the spout joins the casing. Back of this discharge opening 15 is provided an upstanding partition or lip 16.

The fan 12 is mounted on a horizontal shaft 17 which extends in both directions through the side walls 18 of the casing. The shaft is supported in suitable bearings 19 one on each side of the casing, and the side walls 18 are provided with central apertures 20 of considerably greater diameter than the shaft for the intake of air. The fan has a plurality of radially directed arms 21 upon which the fan blades 22 are firmly secured, as by bolts 23 or the like. In the drawings six blades have been shown, but it is evident that any other suitable number may be selected. These blades are substantially of the full width of the casing and almost touch the cylindrical wall of the casing. They are mounted to revolve in clockwise direction, as seen in Figure 2 and indicated by arrow X, so that air drawn in through the side openings 20 in the casing will be projected through the spout 13 which is inclined about forty-five degrees against the horizontal plane.

One end of the shaft 17 carries a pulley 24 adapted to receive a belt connected with a suitable source of power for revolving the fan. The other end of the shaft 17 carries a sprocket wheel 25 which is smaller than the pulley and the use of which will presently be described.

On top of the casing is secured a channel or trough 26 for a conveyer 27. The bottom 28 of the trough extends some distance to the rear of the fan casing 11 and has a transverse wall 29 at its lower end. Similarly another transverse wall 30 is provided at the upper end of the trough at which place, however, the bottom 28 terminates even with the receiving opening 14 in the spout. Above this opening is carried a spindle 31 having a sprocket wheel 32 for a conveyer chain 33. The lower end of the conveyer chain is taken around a second sprocket 34 mounted on a spindle 35 at the lower end of the trough, suitable bearings being provided for these spindles in the trough. The conveyer is of the raker chain kind. That is to say, a plurality of rakes 36 are secured in spaced relation on the chain 33. These rakes consist of square section bars which extend in transverse direction from side to side of the trough, as best seen in Figure 3. It is evident that instead of this raker chain conveyer an ordinary belt conveyer may be used if so desired.

The lower end of the trough 26 is provided with side walls 37 of greater height than the rest of the side walls of the trough and between these side walls 37 is carried revolubly a spindle 38 upon which a hopper 39 is hinged. This hopper extends rearwardly from the trough 26 and is of similar construction to the latter. That is to say, it is provided with a closed bottom 40 and contains a conveyer 41 like the already described conveyer 27. The conveyer 41 is carried over a sprocket wheel 42 at its forward end, this sprocket wheel being secured on the spindle 38. The rear end of the conveyer is similarly supported on a sprocket wheel 43 which is carried on a spindle 44 revolubly mounted at the rear end of the hopper 39. Between the upper and lower runs of the conveyer 27 and 41 are inserted boards 45 and 46, respectively, which are intended to sustain the weight of the conveyer and the grain carried between the rakes. The hopper 39 is open on its upper side and at its front end and is provided with a guard 47 at its rear end adapted to conduct the grain when thrown into the hopper so that it will fall between the rakes 48 upon the board 46. The hopper has suitable hinged legs 49 for adjusting the height of the rear end thereof and, when not in use, the hopper may be swung around the axis of the spindle 38 to fold over the trough 26.

The spindle 31 at the front end of the trough 26 carries a sprocket wheel 50 which is connected by means of a chain 51 with the sprocket wheel 25 on the shaft 17. By this means the conveyer 27 is operated simultaneously with the turning of the fan 12. A chain 52 runs over the sprocket wheels 53 and 54 mounted, respectively, on the spindles 35 and 38. It will thus be seen that, whenever the conveyer 27 is moving, the conveyer 41 in the hopper will also move and the arrangement is made so that the upper runs of the conveyers proceed in the forward direction of the apparatus when the fan 12 is revolving in clockwise direction, as indicated by the arrow X in Figure 2.

The apparatus is used in the following manner. As soon as the fan 12 has been started and the conveyers 27 and 41 are in motion, grain is thrown in at the guard 47 of the hopper, thus depositing the same between the rakes 48 upon the board 46 thereof. This grain is gradually carried forward by the conveyer and dumped upon the board 45 between the rakes 36 of the main conveyer which carries it upwardly to the upper end of the trough when the grain actuated by gravity proceeds in a downward direction through the receiving opening 14 of the spout 13. As the fan at this time rotates, a strong air current will be driven through the spout 13 and through the falling grain, thus carrying away dust, chaff and other foreign matter that might be mixed with the grain. The grain will fall down upon the bottom of the spout 13 and slide down the same and out through the discharge opening 15 where it may be collected and stored. The partition or tongue 16 will prevent any grain from falling on the fan itself and prevent the free working of the latter.

Having thus described the invention, I claim:

In a grain separator, a main conveyer including a trough extending at an upward incline and having a bottom formed with an outlet adjacent its upper end, side walls, an upper end wall, and a lower end wall of greater height than the side walls, auxiliary side wall sections secured against the outer faces of the lower portions of said side walls and projecting upwardly above the lower end wall and cooperating therewith to form a hopper for the lower end portion of the trough, means for moving grain upwardly through said trough for passage out of the outlet adjacent the upper end thereof, and an auxiliary conveyer including a trough pivotally mounted at one end between said auxiliary side wall sections above said side walls and in advance of said end wall for swinging movement from a folded position in overlying relation to the first trough to an extended position with its bottom resting upon the upper edge of the lower end wall of the first trough, and means for moving grain through the auxiliary trough and delivering the same into the lower end portion of the main trough.

In testimony whereof I affix my signature.

CHARLES QUADE. [L. S.]